United States Patent [19]
Levand, Jr. et al.

[11] 3,742,117
[45] June 26, 1973

[54] OXIDATION-RESISTANT SEAL

[75] Inventors: Victor A. Levand, Jr., Lyndhurst; Richard H. Holcomb, South Euclid, both of Ohio

[73] Assignee: General Electric Company, Schenectady, N.Y.

[22] Filed: May 11, 1972

[21] Appl. No.: 252,298

[52] U.S. Cl......... 174/50.64, 174/50.59, 174/50.62, 313/317
[51] Int. Cl................................................ H01j 5/38
[58] Field of Search..................... 174/17.05, 17.08, 174/50.58, 50.59, 50.61, 50.62, 50.63; 313/219, 274, 317, 318, 332

[56] References Cited
UNITED STATES PATENTS

| | | | |
|---|---|---|---|
| 475,998 | 5/1892 | Burnett et al.................. | 174/50.61 |
| 523,305 | 7/1894 | Criggal......................... | 174/50.59 X |
| 839,023 | 12/1906 | Nellis............................ | 174/50.59 |
| 1,930,088 | 10/1933 | Foulke......................... | 174/50.59 X |
| 2,802,896 | 8/1957 | Tierman et al................ | 174/50.62 |
| 3,211,826 | 10/1965 | Holcomb et al............... | 174/50.64 |
| 3,588,315 | 6/1971 | Levand, Jr. et al............ | 174/50.64 |

*Primary Examiner*—Laramie E. Askin
*Attorney*—Emil F. Sos, Jr. et al.

[57] ABSTRACT

A seal for an electrical device comprising a fused silica member, a refractory metal lead-in conductor and an oxidation preventing barrier of silicone. The conductor has a foil portion attached to an outer lead which is embedded in the fused silica member thereby forming a capillary passage from the ambient air to the foil portion. This capillary passage is effectively closed off from moisture by filling it with a moisture-resistant, heat-resistant polymeric hydrocarbon silicone resin.

3 Claims, 1 Drawing Figure

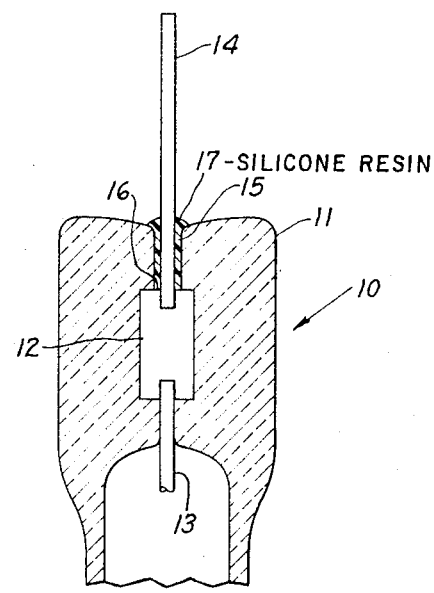

OXIDATION-RESISTANT SEAL

BACKGROUND OF THE INVENTION

1. Field of the Invention

The invention relates generally to electrical devices with hermetically sealed envelopes. More particularly, it relates to envelopes having a foil lead-in conductor susceptible to oxidation from moisture and the use of a silicone resin to prevent such oxidation.

2. Description of the Prior Art

Due to the difference in coefficients of expansion between glass and relatively thick metal leads, it is necessary in some electrical devices to have a thin foliated portion as part of a lead-in conductor to form a hermetic seal. A capillary passageway forms between the relatively thick outer lead wire and fused silica and extends from the edge of the silica to the edge of the foil. Moisture can penetrate this capillary passageway and cause the thin foliated portion to oxidize thereby cracking the hermetic seal and reducing the life of the electrical device.

Certain types of electrical devices operate at seal temperatures below 300°C. This seal temperature would not normally be high enough to cause foil oxidation which usually occurred at elevated temperatures of 350° or higher. It has been found, however, that through the combination of moisture and temperatures ranging from approximately 20° C to 300° C, foil oxidation takes place and splits the hermetic seal between the foil and fused silica.

An inexpensive effective method of creating a barrier between the moisture and the foil portion has been sought for some time. The barrier necessary to protect the foil from the moisture-temperature oxidation problem must have the qualities of being moisture-resistant while simultaneously being capable of operating at elevated temperatures up to approximately 300° C.

SUMMARY OF THE INVENTION

It is, therefore, an object of the invention to provide a moisture barrier between the air and the foil portion of the hermetic seal. A further object of the invention is to provide a barrier which does not decompose at temperatures up to 300°C. Still another object of the invention is to provide a material which is inexpensive and can easily be applied to the capillary passageway to form the barrier.

In accordance with the invention, it has been discovered that a certain type silicone resin will substantially inhibit the oxidation of the foil caused by the moist air. The particular silicone resin has moisture resistance properties and is also capable of withstanding temperatures up to 300°C without decomposition. Furthermore, the resin is fluid and pliable at room temperatures and will therefore flow down and fill the capillary passage formed between the outer lead wire and the fused silica thereby giving the desired barrier in an efficient economical fashion. The particular silicone resin is such that the ratio of the hydrocarbon group to the silicon atom varies from 1.0 to 1.9 and is marketed by the General Electric Company under the trade designation of SR-82.

BRIEF DESCRIPTION OF THE DRAWING

The drawing shows a fragmentary elevation of one end of an electrical device such as a lamp embodying the invention.

DESCRIPTION OF THE PREFERRED EMBODIMENTS

Referring to the drawing, an electrical device such as a lamp is illustrated therein with a seal 10 formed at the end of the device. The seal 10 is comprised of a fused silica member 11, a foliated metal foil portion 12, inner lead wire 13 and outer lead wire 14. The hermetic seal of the electrical device is formed between the foliated metal portion 12 and the fused silica member 11. Thin foliated foil 12 is sufficiently wide to carry the required electrical current of the device and thin enough to form a hermetic seal between the fused silica and the foil itself which is made of refractory metal such as molybdenum.

Inner lead 13 extends into the envelope formed by member 11 and may be connected to an energy translation device such as a lamp filament. Outer lead 14 extends beyond the fused silica seal 10 and makes contact with a source of power (not shown). Due to the relative thickness of outer lead 14 and the difference in coefficients of expansion between the lead and fused silica member 11, a capillary passageway 15 is formed between the lead and the fused silica.

It has been found that moisture filters into passageway 15 and, at temperatures of 20° C or above, oxidizes the outer edge 16 of the foil portion 12. Oxidation can occur when the electrical device is in storage, in transit or when the device is operating in a moist atmosphere. The oxidation reaction caused by the moisture of the air may be accelerated when the lamp is in operation because the seal temperature is usually 150° C or greater. The electrical device may fail prematurely because the oxidized foliated portion pulls away from the fused silica thereby breaking the hermetic seal.

To prevent the harmful oxidation reaction brought about by moisture and temperature, a silicone resin 17 is inserted into the passageway 15 to effectively block the foil portion 12 from any moisture. Silicone resin 17 is composed of polymers which have a hydrocarbon group such as methyl ($CH_3$) linked to the silicon atom. The particular resin which was found to effectively prevent moisture from penetrating into the foil area and still be capable of withstanding seal temperatures up to approximately 300° C is marketed by the General Electric Company under the trade designation SR-82.

This resin is composed of a mixture of two polymers in which the ratio of the hydrocarbon group, methyl or phenyl, to the silicon atom varies from 1.0 to 1.9. These polymeric silicone resins are more fully described in U.S. Pats. Nos. 2,258,218 and 2,258,221, assigned to the assignee of the present invention. The solvent used to suspend the silicone resin and make it fluid and pliable is Xylol, and in the SR-82 resin, the Xylol varies from 3.5 to 5.5 by volume.

Although the silicone resin filling is particularly effective as a barrier in the passageways of lamps or electrical devices in which the seal temperature does not exceed 300°C, it can also be used to protect the seal from moisture while in transit for electrical devices in which the seal temperature during operation may exceed the decomposition temperature of the silicone resin.

The SR-82 resin leaves a crystal-like residue in the passageway after it decomposes. This residue is not harmful to the seal components and will not solidify to the extent that the residue causes stress in the seal area.

Therefore, even devices with high seal temperature can receive some protection from moisture at least up to the point at which the elevated seal temperature decomposes the silicone.

What we claim as new and desire to secure by Letters Patent of the United States is:

1. A seal for electrical devices comprising a member of essentially fused silica and a lead-in conductor sealed in and extending through said member, the conductor including an intermediate thin foil portion of refractory metal hermetically sealed within said member and subject to oxidation from moisture at temperatures between 20° C and 300° C, and an outer lead wire portion of metal connected to and extending from said foil portion through said silica member to the exterior thereof with a capillary passage between the silica member and the part of said outer lead wire enclosed thereby, and a filling in said passage of heat-resistant, moisture-resistant, polymeric hydrocarbon silicone.

2. A seal as claimed in claim 1 wherein the polymeric hydrocarbon silicone is a mixture of two or more polymeric silicones in which the ratio of hydrocarbon groups to silicon atoms is between 1.0 and 1.9.

3. A seal as claimed in claim 2 wherein the hydrocarbon groups are methyl and phenyl.

* * * * *